United States Patent
Lee

[15] 3,681,367
[45] Aug. 1, 1972

[54] CERTAIN PYRIDYLALKYL DERIVATIVES OF 2-AMINO-5-PHENYL-2-OXAZOLIN-4-ONES

[72] Inventor: Cheuk Man Lee, Waukegan, Ill.

[73] Assignee: Abbott Laboratories, North Chicago, Ill.

[22] Filed: Sept. 25, 1970

[21] Appl. No.: 75,679

[52] U.S. Cl.......260/295 AM, 260/295.5 A, 424/266
[51] Int. Cl...............................................C07d 31/44
[58] Field of Search..................260/295 AM, 295.5 A

[56] References Cited

OTHER PUBLICATIONS

Chem. Abstracts, Vol. 57, 13, 760-i-13, 761-c, (1962) abstracting Belgian Patent No. 613,985 dated Feb. 28, 1962

*Primary Examiner*—Alan L. Rotman
*Attorney*—Robert L. Niblack

[57] ABSTRACT

2-Pyridylalkylamino-5-phenyl-2-oxazolin-4-ones with optional simple substituents in the phenyl ring or in the connecting alkylamino bridge between the two heterocyclic rings were found to be valuable antidepressants when administered orally to warm-blooded animals.

11 Claims, No Drawings

CERTAIN PYRIDYLALKYL DERIVATIVES OF 2-AMINO-5-PHENYL-2-OXAZOLIN-4-ONES

DETAILED DESCRIPTION OF THE INVENTION

The present invention is directed to new chemical compounds as well as their use as tranquilizers and anti-depressants. More particularly, the invention is directed to compounds of the formula

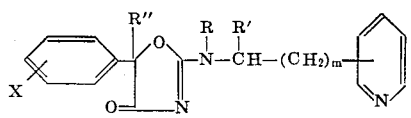

wherein X is hydrogen, halogen, trifluoromethyl or methoxy, m is 0 or 1, R is hydrogen or methyl, R' is hydrogen or methyl and R'' is hydrogen, methyl or phenyl. These new compounds have a very interesting pharmacological profile: they are classified as tranquilizers with pronounced anti-depressant activity and extremely low toxicity. Unlike other tranquilizers, the new compounds have no sedative effect which distinguishes them very favorably over other tranquilizers and chemically closely related 5-phenyl-4-oxazolinones.

The new compounds are generally prepared by refluxing 2-amino-5-phenyl-2-oxazolin-4-ones with at least one molar equivalent of the appropriate aminoalkylpyridine for at least 2 days, using an inert organic solvent as the reaction medium which has a boiling point below 120° C. Alternately, i.e., when R is methyl, 2-amino-5-phenyl-2-oxazolin-4-one is heated with excess methylaminoalkylpyridine to 125°–150° C. for at least 2 hours.

In order to illustrate the above general procedure more specifically, reference is made to the following examples which, however, are not meant to limit the present invention in any respect.

EXAMPLE 1

A mixture of 8.8 g. of 2-amino-5-phenyl-2-oxazolin-4-one, 5.4 g. of 2-aminomethylpyridine and 300 ml. of absolute ethanol was refluxed under stirring for 96 hours. The solvent was then evaporated in vacuo and the residue was recrystallized from ethanol to give 7.3 g. of pure 2-[(2-pyridylmethyl)amino]-5-phenyl- 2-oxazolin-4-one, melting at 99°–101° C.

EXAMPLES 2–17

The procedure of Example 1 was followed in each of the following examples wherein in each case, equimolar amounts of 2-amino-5-phenyl-2-oxazolin-4-one or the correspondingly 5-disubstituted derivatives thereof (Examples 6, 14, 15 and 17) are refluxed with the corresponding aminoalkylpyridine. The following table lists the melting points of the specific compounds together with the substituents as designated in formula I as well as the position of the pyridine ring (Py-Pos.) to which the alkylene groups is attached. In all instances, R is hydrogen.

| Ex. No. | X | R' | m | R'' | Py-Pos | m.p. °C |
|---|---|---|---|---|---|---|
| 2 | H | H | 0 | H | 3 | 166–7 |
| 3 | H | H | 0 | H | 4 | 148–50 |
| 4 | 2-F | H | 0 | H | 2 | 125–6 |
| 5 | 4-MeO | H | 0 | H | 2 | 135–7 |
| 6 | H | H | 0 | Ph | 2 | 159–60 |
| 7 | H | Me | 0 | H | 2 | 173–4 |
| 8 | H | Me | 0 | H | 4 | 199–200 |
| 9 | H | H | 1 | H | 2 | 133–4 |
| 10 | H | H | 1 | H | 4 | 173–5 |
| 11 | 4-Cl | H | 1 | H | 2 | 149–50 |
| 12 | 4-MeO | H | 1 | H | 2 | 124–5 |
| 13 | 3-CF$_3$ | H | 1 | H | 2 | 171–2 |
| 14 | H | H | 1 | Ph | 2 | 140–2 |
| 15 | 4-Cl | H | 1 | Ph | 2 | 121–3 |
| 16 | H | Me | 1 | H | 2 | 144–5 |
| 17 | H | H | 1 | Me | 2 | 134–5 |

Me indicates methyl and Ph stands for phenyl.

EXAMPLE 18

A mixture of 17.6 g. of 2-amino-5-phenyl-2-oxazolin-4-one and 36.6 g. of 2-(methylaminomethyl)pyridine was stirred and heated in an oil bath maintained at 140°–50bL C. for 4 hours. The excess amino was then removed by vacuum distillation and the residue was recrystallized from ethanol to produce 13.6 g. of pure 2-[(2-pyridylmethyl)methylamino]-5-phenyl-2-oxazolin-4-one, melting at 118°–20° C.

EXAMPLE 19

In a repetition of Example 18 but replacing the above 2-(methylaminomethyl)pyridine with the corresponding 4-substituted compound, 2-[(4-pyridylmethyl)methylamino]-5-phenyl-2-oxazolin-4-one, melting at 186°–8° C. was obtained.

EXAMPLE 20

In a further repetition of Example 18 but replacing the 2-(methylaminomethyl)pyridine with an equimolar amount of 2-(methylaminoethyl)pyridine, pure 2-[(2-pyridylethyl)methyl-amino]-5-phenyl-2-oxazolin-4-one melting at 130°–1° C. was obtained.

EXAMPLE 21

The anti-depressant activity of the compounds described above was tested in mice by the modified Dopa-test (described by Everett in Excerptia Intl. Congress Series No. 122, page 164–7) The test animals were given a 2 percent suspension of the test compound in 0.3 percent tragacanth by the oral route and observed after 4 hours using a rating scale of 0–3 with 1 indicating slight activity, 2 representing moderate and 3 indicating pronounced activity. The test compounds are identified in the following table by reference to the above example numbers. The table also lists the oral LD$_{50}$ values for mice indicating the extremely low toxicities of the new compounds.

TABLE I

| Test Compound | LD$_{50}$ | Dosage | Activity Rating |
|---|---|---|---|
| 1 | 1.0 g/kg | 50 mg/kg | 2 |
| 1 | 1.0 g/kg | 100 mg/kg | 3 |
| 5 | 1.0 g/kg | 100 mg/kg | 2 |
| 6 | 1.0 g/kg | 100 mg/kg | 2 |
| 8 | 1.0 g/kg | 100 mg/kg | 2 |
| 9 | 1.0 g/kg | 100 mg/kg | 2 |
| 12 | 1.0 g/kg | 25 mg/kg | 3 |
| 14 | 1.0 g/kg | 25 mg/kg | 3 |
| 15 | 1.0 g/kg | 25 mg/kg | 3 |
| 16 | 1.0 g/kg | 25 mg/kg | 1 |
| 17 | 0.7 g/kg | 25 mg/kg | 3 |
| 18 | 1.0 g/kg | 100 mg/kg | 2 |
| 19 | 1.0 g/kg | 25 mg/kg | 1 |

As seen above, the oral toxicity values are so low that in most instances, a $LD_{50}$ cannot even be established within practical dosage limits. In view of the low doses required to exhibit moderate to pronounced antidepressant activity, it is clearly demonstrated that the new compounds have excellent therapeutic indexes.

Although the above activity table lists the ratings of the bases according to formula I, it is to be understood that the new compounds may also be administered in form of their non-toxic acid addition salts, particularly the hydrochloride, sulfate, phosphate, acetate, citrate, succinate or tartrate salts. The bases or the corresponding salts may conveniently be formulated into practical solid dosage forms for oral administration, i.e., tablets, pills, lozenges, wafers or into liquid preparations such as a syrup or similar fluids. For any of these dosages forms, the usual pharmaceutically acceptable excipients may be used such as fillers, flavoring agents, coloring agents or the above compounds or their non-toxic salts may be combined with other pharmaceutically active ingredients to make preparations with dual or synergistic effects.

I claim:
1. A compound of the formula

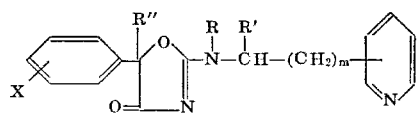

wherein X is hydrogen, halogen, trifluoromethyl or methoxy, m is 0 or 1, R is hydrogen or methyl, R' is hydrogen or methyl and R'' is hydrogen, methyl or phenyl.

2. The compound of claim 1 wherein R, R', R'' and X are hydrogen and the pyridine ring is attached at the 2-position.

3. The compound of claim 2 wherein m is 0.

4. The compound of claim 2 wherein m is 1.

5. The compound of claim 1 wherein R, R', and R'' are hydrogen, m is 1, X is the methoxy group in the 4-position, and the pyridine ring is a attached at the 2-position.

6. The compound of claim 1 wherein R, R' and X are hydrogen and R'' is phenyl and the pyridine ring is attached at the 2-position.

7. The compound of claim 6 wherein m is 0.

8. The compound of claim 6 wherein m is 1.

9. The compound of claim 1 wherein R, R' and X are hydrogen, R'' is methyl, m is 1 and the pyridine ring is attached at the 2-position.

10. The compound of claim 1 wherein R and R' are hydrogen, X is chlorine in the 4-position of the phenyl ring, R'' is phenyl, m is 1 and the pyridine ring is attached at the 2-position.

11. The compound of claim 1 wherein R is methyl, R', R'' and X are hydrogen, m is 0 and the pyridine ring is attached at the 2-position.

* * * * *